United States Patent Office 2,745,875
Patented May 15, 1956

2,745,875

PREPARATION OF N-ACYLAMINO-PHENYL-PROPANE DIOLS

Gustav Ehrhart, Helmut Nahm, and Walter Siedel, Frankfurt am Main, Germany, assignors to Farbwerke Hoechst Aktiengesellschaft vormals Meister Lucius & Brüning, Frankfurt am Main, Germany, a corporation of Germany No Drawing. Application June 25, 1954,
Serial No. 439,472

Claims priority, application Germany June 30, 1953

9 Claims. (Cl. 260—558)

The present invention relates to a process for the manufacture of amino-alcohols.

It is known to prepare amino-alcohols by reduction of the corresponding amino-acid esters with the aid of reducing agents customarily used for such reactions, for instance, complex metal hydrides, or by catalytic reduction. However, relatively poor yields are obtained by the known processes since the recovery and isolation of the reducing agents is complicated and involves difficulties.

Now, we have found that amino-alcohols can be obtained in a pure state and in good yield by reducing the corresponding N-acylated amino-acid azides with complex metal hydrides.

It is surprising that the process of this invention should afford considerable advantage as compared with the direct reduction of the esters to the alcohols referred to above, for instance, with lithium aluminum hydride, since, notwithstanding the intermediate stages for preparing the azides from esters, the yields are better and the reaction products are obtained in a purer and more unitary state. In addition, the reduction products can be isolated much more easily than in the known processes.

It could not be foreseen that the reduction of the azides to the corresponding alcohols with elimination of the nitrogen would proceed smoothly, especially as it is known that (a) By the reduction of the chlorides, nitriles or amides of fatty acids with lithium aluminum hydride the corresponding aldehydes are obtained in a poor yield, and (b) Carbonyl groups linked to a nitrogen atom are reduced to methylene groups, the nitrogen atom remaining in the molecule.

Acid amides, for instance, are reduced in this manner to methylamines containing the corresponding substituents, and acid lactams are reduced to cyclic imino compounds (Arzneimittelforschung, volume 4, page 30).

As starting materials for the process of this invention there come into consideration azides of monobasic and also polybasic mono- and diamino-acids of the aliphatic aromatic and heterocyclic series. There may especially be mentioned: threo-N-acetyl-β-phenyl-serine azide, threo-N-acetyl-β-(4-chlorophenyl)-serine azide, threo-N-acetyl-β-phenyl-β-methoxy-α-aminopropionic acid azide, threo-N - acetyl - β - (4 - nitrophenyl) - β - methoxy - α - aminopropionic acid azide, N-acetyl-phenylalanine azide, N - acetyl - (4 - nitro - phenyl) - alanine azide, N - benzoyl-γ-amino-butyric acid azide, threo-N-acetyl-β-(4-phenyl-phenyl)-serine azide, N-acetyl-β-(4-chloro-phenyl) - β - aminopropionic acid azide, N - acetyl - β - (2 - nitrophenyl) - β - aminopropionic acid azide, threo - N - acetyl - β - (4 - methyl mercapto - phenyl) - serine azide, threo-N-dichloracetyl-β-(4-methyl-mercapto-phenyl)-serine azide, erythro-N-acetyl-β-(4-methyl-mercapto-phenyl)-serine azide, erythro-N-dichloroacetyl-β-(4-methyl-mercapto-phenyl)-serine azide and DL-threo - β - (paranitrophenyl) - N - dichloroacetyl - serine azide.

In order to prepare the amino-acid azides, the corresponding acid halides may be reacted with alkali azides. Furthermore, the amino-acid azides can be prepared in an advantageous manner from the corresponding amino-acid esters through the hydrazide stage. The intermediate products formed need not be isolated in this case. As starting materials there are used with advantage the esters of the acylated amino-acids with aliphatic alcohols, such as methyl, ethyl, propyl, isopropyl, butyl or amyl alcohol. Starting from the corresponding amino-acid esters, the reaction may also be carried out with araliphatic or aromatic alcohols or phenols, from which the general applicability of the reaction will be understood. When these compounds contain, in addition to the amino group, other reactive groups such as the hydroxyl groups, the latter may be protected by acylation. The conversion of the amino-acid esters into the corresponding hydrazides is advantageously carried out in an inert solvent, the hydrazine being advantageously used in the form of its hydrate. Since the hydrazides obtained are sparingly soluble and precipitate from the reaction mixture, they may be converted into the corresponding azides without further purification. The conversion of the hydrazides into the azides is carried out in known manner, advantageously while cooling well, with nitrous acid, the latter being liberated from a salt thereof during the reaction.

In this case it is not necessary to isolate the azides for the subsequent reduction. Thus, they can be directly subjected to the further treatment with the addition of an organic solvent. As such solvents there come into consideration, for instance, open or cyclic ethers such as diethyl ether, tetrahydrofurane or dioxane, as well as aliphatic acid esters, especially ethyl acetate or mixtures of ethyl acetate and ether.

As reducing agents there are used complex metal hydrides, for instance, lithium aluminium hydride, magnesium aluminium hydride, sodium boron hydride, potassium boron hydride, lithium boron hydride or the like. They may be added in solid form or in the form of solutions. Of special advantage is the use of complex boron hydrides which are stable in water, especially sodium boron hydride, which enables the reduction to be carried out in aqueous solvents, for instance, in aqueous alcohols, and which is very stable at temperatures of about 0° C. and, above all, in the presence of alkali.

Upon working up the reduction mixtures the reaction products are obtained in a relatively pure state and generally in a good yield, in contradistinction to the known process of direct reduction.

If necessary, these products can be recrystallized from solvents such as water, ether, petroleum ether, cyclohexanone, chloroform or carbon tetrachloride.

The following examples serve to illustrate the invention, but they are not intended to limit it thereto; the parts are by weight unless otherwise stated, and the relationship of parts by volume to parts by weight is the same as that of the litre to the kilogram:

EXAMPLE 1

*Threo-O:N-diacetyl-1-phenyl-2-amino-propandiol-(1:3)*

To a solution of 12.4 parts of N-acetyl-phenyl-serine azide in 200 parts by volume of ethyl acetate is added in the course of 10 minutes at —14° C. to —8° C., while stirring, a solution of 2.2 parts of sodium boron hydride (of 98 per cent strength) in 40 parts by volume of methyl alcohol. Subsequently, the whole is stirred for 2 hours at room temperature. After having filtered off the precipitated inorganic salts with suction, the ethyl acetate solution is shaken twice with sodium carbonate solution of 5 per cent strength, and then with 0.5 N-sulphuric acid.

After concentrating the ethyl acetate solution, a residue of 1.5 parts of threo-1-phenyl-2-acetyl-amino-propandiol-1:3 remains as a syrupy mass which, by heating it with acetic anhydride at about 70° C., is converted into threo-O:N-diacetyl-1-phenyl-2-amino-propandiol-1:3 (yield: 1.4 parts, melting point: 168° C.).

N-acetyl-phenyl-serine azide is prepared in the following manner:

96 parts of threo-N-acetyl-phenyl-serine ethyl ester are converted in methanolic solution with 40 parts of hydrazine hydrate into the corresponding hydrazide (melting at 220° C.), and the latter is then converted by means of 29 parts of sodium nitrite in solution in hydrochloric acid into the N-acetyl-phenyl-serine azide (yield: 68 parts; melting point: 140° C. with decomposition).

EXAMPLE 2

*Threo-N-acetyl-1-(4-chlorophenyl)-2-amino-propandiol-(1:3)*

7.28 parts of threo-N-acetyl-β-(4-chlorophenyl)-serine azide are suspended in 150 parts by volume of ethyl acetate and cooled to −50° C. While stirring, a solution of 2 parts of sodium boron hydride (of 89 per cent strength) in 20 parts by volume of methyl alcohol is then added in portions such that the temperature does not exceed −25° C. The reaction mixture is then stirred for a further 30 minutes. The inorganic salts are filtered off with suction, the filtrate is evaporated, and the residue remaining in the form of a yellowish mass is recrystallised from hot water. 3 parts of threo-N-acetyl-1-(4-chlorophenyl)-2-amino-propandiol-1:3 are obtained (melting at 164° C.–165° C.).

The azide is prepared in the following manner:

32 parts of threo-N-acetyl-β-(4-chlorophenyl)-serine ethyl ester (melting at 180° C.) are converted with 8 parts of hydrazine hydrate in ethanolic solution into the corresponding hydrazide (yield: 27 parts, melting point: 256° C.), which is then converted with 2.5 parts of sodium nitrite in solution in hydrochloric acid into the corresponding azide.

EXAMPLE 3

*Threo - N - benzoyl - 1 - phenyl - 1 - methoxy - 2 - amino-propanol-(3)*

20.2 parts of N-acetyl-β-phenyl-β-methoxy-α-amino-propionic acid azide are taken up in 200 parts by volume of ethyl acetate and cooled to −45° C. Within 15 minutes a solution of 2.9 parts of sodium boron hydride (of 89 per cent strength) in 40 parts by volume of ethyl alcohol is added while stirring. After allowing the whole to stand for 2½ hours, the precipitated inorganic salts are filtered off, and the residue, which remains after evaporation of the ethyl acetate, in the form of a light-colored syrup is hydrolyzed by heating it for 4 hours under reflux with 100 parts by volume of 2N-hydrochloric acid to yield the free amine or its hydrochloride. After being shaken with methylene chloride, the hydrochloric solution is evaporated to dryness. After the addition of an excess of sodium hydroxide solution, the residue is benzoylated with 15 parts by volume of benzoyl chloride. 5.6 parts of threo-N-benzoyl-1-phenyl-1-methoxy-2-amino-propanol-(3) (melting at 164° C.) are obtained.

The azide is prepared in the following manner:

10 parts of threo-N-acetyl-β-phenyl-β-methoxy-α-amino-propionic acid ethyl ester (melting point 106° C.) are converted with 4 parts by volume of hydrazine hydrate of 85 per cent strength in ethanolic solution into the corresponding hydrazide (yield: 5 parts, melting point: 232° C.). By slowly adding 6 parts of sodium nitrite in saturated aqueous solution, the hydrazide is converted in sulphuric acid solution into the corresponding azide which separates as a spongy mass.

EXAMPLE 4

*Threo - N - acetyl - 1 - (4 - nitrophenyl) - 1 - methoxy - 2 - amino-propanol-(3)*

26 parts of N-acetyl-β-(4-nitrophenyl)-β-methoxy-α-amino-propionic acid azide are taken up in 125 parts by volume of ethyl acetate. After treatment with sodium tetraborate, the solution is cooled to −30° C. to −45° C. While stirring and further cooling, a solution of 2 parts of sodium boron hydride (of 89 per cent strength) in 20 parts by volume of methyl alcohol is added dropwise, and the whole is then stirred without further cooling, until room temperature is reached. The precipitated inorganic salts and the reaction product are filtered off with suction, the latter is extracted with acetonitrile and united with the quantity which was obtained from the ethyl acetate mother liquor. After recrystallization from acetonitrile diluted with water, there are obtained 2.6 parts of threo-N - acetyl - 1 - (4 - nitro - phenyl) - 1 - methoxy - 2 - amino-propanol-(3) melting at 216–217° C.

The azide is prepared in the following manner:

2 parts of threo-N-acetyl-β-(4-nitrophenyl)-β-methoxy-α-amino-propionic acid methyl ester (melting from 105° C. upwards) are suspended in ethyl alcohol, then converted with 1.5 parts by volume of hydrazine hydrate of 85 per cent strength into the corresponding hydrazide (melting at 248° C.), and, by addition of an aqueous solution of 2.7 parts of sodium nitrite, the hydrazide is converted in hydrochloric acid solution into the corresponding azide.

EXAMPLE 5

*N - acetyl - 1 - phenyl - 2 - amino - 3 - acetoxy - propane*

6.3 parts of N-acetyl-phenyl-alanine azide are taken up, while stirring, with 80 parts by volume of ethyl acetate and, after treatment with sodium tetraborate, the solution is cooled to −40° C. While further cooling, a solution of 1.8 parts of sodium boron hydride (of 89 per cent strength) in 20 parts by volume of methyl alcohol is added in small portions. The solution is then stirred, without cooling, until room temperature is reached and is separated from the precipitated inorganic salts by filtering with suction.

After eliminating the solvent, the oily residue is heated with 10 parts by volume of acetic anhydride for 1 hour on the steam bath. The excess of acetic anhydride is distilled off, the residue is taken up in ethly acetate and, after evaporation of the solvent, N-acetyl-1-phenyl-2-amino-3-acetoxy-propane is recrystallized from petroleum ether (yield 3.1 parts, melting point 117° C.).

The azide is prepared in the following manner:

6 parts of N-acetyl-phenyl-alanine hydrazide are converted with an aqueous solution of 2.5 parts of sodium nitrite into the corresponding azide which separates in the form of flakes.

EXAMPLE 6

*N-acetyl-1-(4-nitrophenyl)-2-amino-3-acetoxy-propane*

8.33 parts of N-acetyl-(4-nitrophenyl)-alanine azide are taken up in 270 parts by volume of ethyl acetate and treated with a sodium tetraborate solution.

The solution is cooled to −40° C. and, while stirring and further cooling, a solution of 1.8 parts of sodium boron hydride (of 89 per cent strength) in 20 parts by volume of methyl alcohol is slowly added. After 10 minutes, when the mixture has reached room temperature, it is separated from the precipitated inorganic salts by filtration with suction. The filtrate is then evaporated.

The partly crystalline mass is heated with 30 parts by volume of acetic anhydride for 1 hour on the steam bath, the mixture is then filtered, and the excess of acetic anhydride is distilled off. The residue, consisting of N-acetyl-1-(4-nitrophenyl)-2-amino-3-acetoxy-propane, is recrystallized from aqueous methyl alcohol (yield: 3.7 parts, melting point: 162° C.).

The azide is prepared in the following manner:

14.4 parts of N - acetyl - N - (4 - nitrophenyl) - alanine methyl ester are converted with 5 parts by volume of hydrazine hydrate of 85 per cent strength in ethanolic solution into the corresponding hydrazide (yield: 11.4 parts, melting point 215° C.). By the addition of an aqueous solution of 2.5 parts of sodium nitrite, the hydrazide is converted in hydrochloric acid solution into the corresponding azide.

EXAMPLE 7

N-benzoyl-4-aminobutanol-(1)

50.4 parts of N-benzoyl-$\gamma$-amino-butyric acid azide are taken up in 60 parts by volume of ethyl acetate and, after a treatment with sodium tetraborate solution, a solution of 1.5 parts of sodium boron hydride in 15 parts by volume of methyl alcohol is added dropwise, while stirring well at —45° C. After removal of the cooling device and when the solution has reached room temperature, the precipitated inorganic salts are filtered off with suction and the solvent is distilled off. The residue it taken up in chloroform, the solution is filtered and, subsequently, the chloroform is distilled off. The residue, which is a light-colored oil, very soon crystallizes. The crystals are filtered off with suction and washed with ether. After recrystallization from chloroform and cyclohexane there are obtained 2.2 parts of N-benzoyl-4-amino-butanol-(1) (melting at 78° C.).

The azide is prepared in the following manner:

10 parts of N-benzoyl-$\gamma$-amino-butyric acid methyl ester are converted with 25 parts by volume of hydrazine hydrate of 25 per cent strength into the corresponding hydrazide (yield: 4.8 parts, melting point: 119° C.). By the addition of an aqueous solution of 1.8 parts of sodium nitrite, and while cooling and stirring, the hydrazide is converted in hydrochloric acid solution into the corresponding azide.

EXAMPLE 8

Threo-N-acetyl-1-(4-phenyl-phenyl)-2-amino-propanol-(3)

6.4 parts of N-acetyl-$\beta$-(4-phenyl-phenyl)-serine azide are suspended, while stirring, in 60 parts by volume of ethyl acetate and, while cooling well to —40° C., a solution of 2 parts of sodium boron hydride in 20 parts by volume of methyl alcohol is added. The reaction sets in suddenly while the temperature rises to +5° C.

The inorganic salts are filtered off after one hour and the ethyl acetate is evaporated. The oily residue is dissolved in hot chloroform, the solution is filtered and concentrated. Thereupon petroleum ether is added and the precipitate formed is filtered off with suction. After a treatment with a sodium carbonate solution of 10 per cent strength, the precipitate is again filtered off with suction and subsequently washed with water. By recrystallization from aqueous methyl alcohol there are obtained 3.3 parts of threo-N-acetyl-1-(4-phenyl-phenyl)-2-amino-propanol-(3) (melting at 194–195° C.).

The azide is prepared in the following manner:

184 parts of threo-$\beta$-(4-phenyl-phenyl)-serine (melting at 184–187° C.), obtained by reaction of 4-phenyl-benzaldehyde with amino-acetic acid, are converted in the usual manner into the 4-phenyl-phenyl-serine methyl ester (melting point 114° C.). The threo-N-acetyl-$\beta$-(4-phenyl-phenyl)-serine methyl ester (melting point: 214° C.) obtained therefrom by acetylation with acetic anhydride is converted into the corresponding hydrazide (melting at 216–219° C.) with a mixture of 25 parts by volume of hydrazine hydrate of 85 per cent strength and 300 parts by volume of dioxane. The hydrazide is then dissolved in dimethyl-formamide and, with the addition of hydrochloric acid, is converted into the corresponding azide with an aqueous solution of 2.5 parts of sodium nitrite.

EXAMPLE 9

O:N-diacetyl-1-(4-chlorophenyl)-amino-propanol-(3)

A solution of 9.18 parts of N-acetyl-$\beta$-(4-chlorophenyl)-$\beta$-amino-propionic acid azide in 115 parts by volume of ethyl acetate is wished with a small quantity of sodium tetraborate solution, and is then filtered. A solution of 2 parts of sodium boron hydride (of 96 per cent strength) in 20 parts by volume of methanol is added dropwise at —40° C. After cessation of the reaction, the whole is stirred for a further hour at room temperature. The inorganic salts formed are filtered off and the ethyl acetate is evaporated. The residue is dissolved in chloroform, the solution is filtered and the solvent is evaporated.

The product is acetylated in the usual manner with acetic anhydride. The residue remaining after evaporation of the excess of acetic anhydride is recrystallized from benzene, petroleum ether, and O:N-diacetyl-1-(4-chlorophenyl)-1-amino-propanol-(3) is obtained (yield: 5.5 parts, melting point: 114° C.).

The azide is obtained in the following manner:

19 parts of N-acetyl-$\beta$-(4-chlorophenyl)-$\beta$-amino-propionic acid methyl ester (melting point: 119° C.) are converted in methanolic solution into the corresponding hydrazide (melting at 228° C.) by means of 12 parts by volume of hydrazine hydrate of 85 per cent strength. While cooling, the hydrazide is then converted in hydrochloric acid solution into the corresponding azide with an aqueous solution of 3.3 parts of sodium nitrite.

EXAMPLE 10

O:N-diacetyl-1-(2-nitrophenyl)-1-amino-propanol-(3)

4.4 parts of N-acetyl-$\beta$-(2-nitrophenyl)-$\beta$-amino-propionic acid azide are suspended in 80 parts by volume of ethyl acetate. While stirring, there is added dropwise at —25° C. a solution of 1.5 parts of sodium boron hydride in 15 parts by volume of methyl alcohol. After 30 minutes the temperature is allowed to rise to room temperature, and the inorganic salts formed are filtered off with suction. After evaporation of the solvent, the residue is extracted with chloroform, the solution is filtered, and the solvent is evaporated.

The remaining syrup is heated for 1 hour on the steam bath with 10 parts by volume of acetic anhydride and the excess of acetic anhydride is evaporated under reduced pressure. The crystalline residue is filtered off with suction and washed with ether. By recrystallization from benzene there are obtained 1.6 parts of O:N-diacetyl-1-(2-nitrophenyl)-1-aminopropanol-(3) (melting at 106° C.).

The azide is prepared in the following manner:

12 parts of N-acetyl-$\beta$-(2-nitrophenyl)-$\beta$-amino-propionic acid methyl ester (melting at 156° C.) are converted in methanolic solution into the corresponding hydrazide (melting at 212° C.) by means of 5 parts by volume of hydrazine hydrate of 85 per cent strength. In hydrochloric acid solution the hydrazide is then converted into the corresponding azide with an aqueous solution of 2 parts of sodium nitrite.

EXAMPLE 11

DL-threo-1-(para-nitrophenyl)-2-(N-dichloracetyl-amino)-propandiol-(1:3)

A solution of 35 parts of sodium boron hydride in 375 parts by volume of methanol is added within 30 minutes, while stirring and cooling to —35° C., to 321 parts of DL-threo-$\beta$-(paranitrophenyl)-N-dichloracetyl-serine azide in a mixture of ether and ethyl acetate. The whole is then stirred for a further hour. Subsequently, the inorganic salts are filtered off with suction and washed with ethyl acetate. The combined ethyl acetate-ether solutions are washed with 0.5N-sulphuric acid, and then with sodium bicarbonate solution and water. By evaporation of the solvent, there are obtained 298 parts of the crude DL-threo-1-(para-nitrophenyl)-2-

(N-dichloracetylamino)-propandiol-(1:3). By recrystallization from ethyl acetate, the product is obtained in pure form. (Yield: 180 parts, melting point: 152° C.)

The azide is prepared in the following manner.

93 parts of DL-threo-β-(para-nitrophenyl)-N-dichloracetyl-serine ethyl ester are converted with 19 parts by volume of hydrazine hydrate of 85 per cent strength in ethanolic solution into the corresponding hydrazide (melting at 218° C.). While cooling and in sulphuric acid solution, the hydrazide is then converted into the corresponding azide by means of an aqueous solution of 4.5 parts of sodium nitrite.

EXAMPLE 12

*DL-threo-1-(para-nitrophenyl)-2-(N-dichloracetylamino)-propandiol-(1:3)*

20 parts of DL-threo-β-(para-nitrophenyl)-N-dichloracetyl-serine azide are dissolved in anhydrous ether and, while stirring and cooling well, a solution of 4 parts of lithium aluminium hydride in 500 parts by volume of anhydrous ether is added dropwise. After further stirring for 2 hours, 20 parts by volume of water are added to the reaction mixture. Then the residue is separated from the ether by filtering with suction, and extracted under reflux 3 times for 30 minutes on each occasion with boiling ethyl acetate. The combined ethyl acetate extracts are shaken with 1N-hydrochloric acid or 1N-sulphuric acid, then with 0.5N-sodium carbonate solution, and finally washed with water until neutral. The resin remaining after concentration of the ethyl acetate solution is taken up in boiling water. The solution is then treated, while hot, with active charcoal, concentrated under reduced pressure to half its volume, and clarified once more with active charcoal.

After further concentration to 50 parts by volume, DL-threo-1-(para-nitrophenyl)-2 - (N - dichloracetylamino)-propandiol-(1:3) (melting at 152° C.) crystallizes out.

The azide is prepared in the manner described in Example 11.

We claim:

1. The process of preparing acylamino-alcohols, which comprises reacting an amino-acid azide having the formula

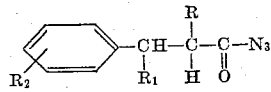

wherein R is a member selected from the group consisting of N-lower alkanoyl, N-(halo-lower alkanoyl) and N-benzoyl radicals, wherein R is a member selected from the group consisting of hydroxy, lower-alkoxy and acetoxy radicals, and wherein R₂ is a member selected from the group consisting of hydrogen, chloro, nitro, methylmercapto, and phenyl radicals, with a member selected from the group of complex metal hydrides consisting of alkali metal boron hydrides, alkali metal aluminum hydrides, alkaline earth metal boron hydrides and alkaline earth metal aluminum hydrides, in the presence of an aliphatic oxygen-containing solvent to thereby form an intermediate complex and in the presence of a member selected from the group consisting of water and a lower aliphatic alcohol as hydrogen donators for breaking up the intermediate complex, and adding water to the reaction mixture thus obtained to thereby obtain the corresponding acylamino alcohol in a pure state.

2. The process of claim 1, wherein said azide has the formula

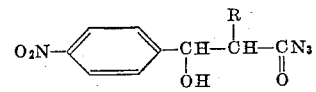

R representing an N-lower alkanoyl radical.

3. The process of claim 1, wherein said azide has the formula

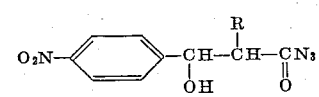

R representing an N-(halo-lower alkanoyl) radical.

4. The process of claim 1, wherein said azide has the formula

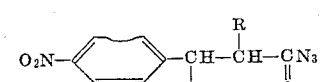

R representing an N-benzoyl radical.

5. The process of claim 1, wherein said azide is threo-1-(para-nitrophenyl)-2-N-dichloracetylserino azide.

6. The process of claim 1, wherein said oxygen-containing solvent is an aqueous lower aliphatic alcohol and said complex metal hydride is an alkali metal boron hydride.

7. The process of claim 1, wherein said azide has the formula

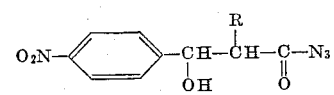

R representing an N-(halo-lower alkanoyl) radical, said oxygen-containing solvent is aqueous methyl alcohol, and said complex metal hydride is sodium boron hydride.

8. The process of claim 1, wherein said azide has the formula

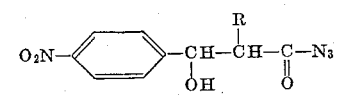

R representing an N-(halo-lower alkanoyl) radical, and said complex metal hydride is an alkali metal aluminum hydride.

9. The process of claim 1, wherein said azide has the formula

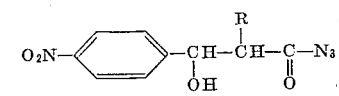

R representing an N-(halo-lower alkanoyl) radical, and said complex metal hydride is lithium aluminum hydride.

References Cited in the file of this patent

Boyer: "J. Am. Chem. Soc.," vol. 73 (1951), pp. 5865–66.